Figure 1:
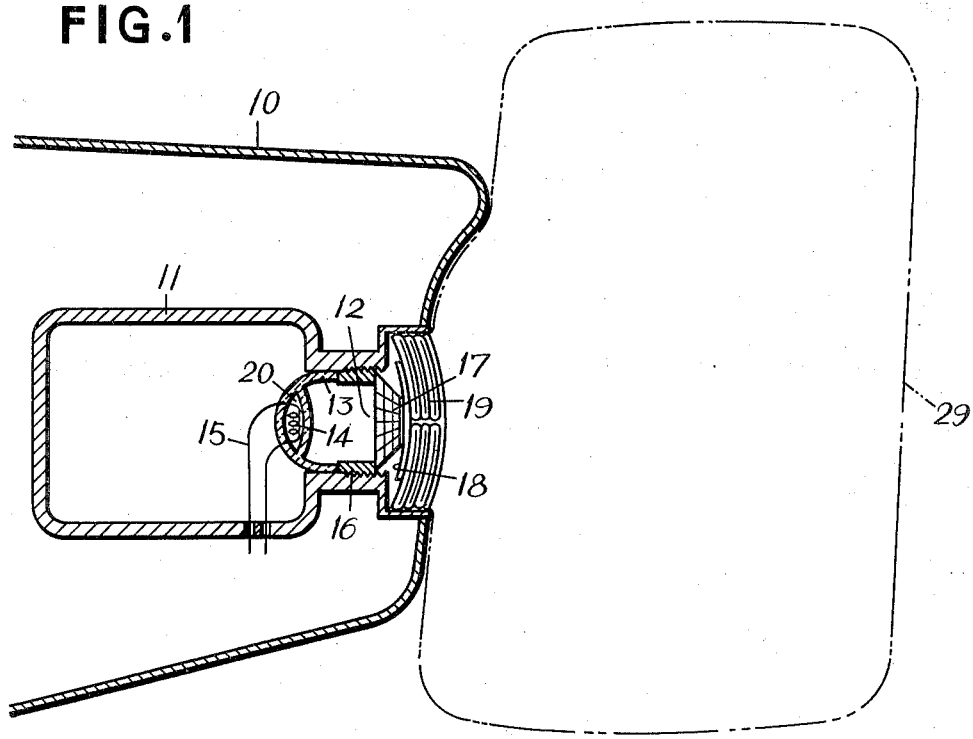

United States Patent [19]

Ochiai

[11] 3,822,895
[45] July 9, 1974

[54] INFLATABLE RESTRAINT DEVICE FOR OCCUPANTS OF VEHICLES AND THE LIKE

[75] Inventor: Takeshi Ochiai, Toyota, Japan

[73] Assignee: Toyota Jidosha Kogyo Kabushiki Kaisha, Toyota City, Aichi-ken, Japan

[22] Filed: Dec. 13, 1971

[21] Appl. No.: 207,385

[30] Foreign Application Priority Data
 Dec. 25, 1970 Japan.............................. 45-128772

[52] U.S. Cl. .............. 280/150 AB, 137/69, 137/72, 222/3, 317/79
[51] Int. Cl. ............................................... B60n 21/08
[58] Field of Search..... 280/150 AB; 222/3; 137/67, 137/68; 317/79

[56] References Cited
UNITED STATES PATENTS

| | | | |
|---|---|---|---|
| 1,361,689 | 12/1920 | Crousaz........................... | 317/79 X |
| 1,845,305 | 2/1932 | Macrae............................ | 317/79 |
| 3,209,937 | 10/1965 | Hirst et al. ...................... | 137/70 X |
| 3,336,045 | 8/1967 | Kobori........................... | 280/150 AB |
| 3,527,472 | 9/1970 | Chute et al................... | 280/150 AB |
| 3,567,245 | 3/1971 | Ekstrom....................... | 280/150 AB |
| 3,586,347 | 6/1971 | Carey et al................... | 280/150 AB |
| 3,618,976 | 11/1971 | Leising et al................ | 280/150 AB |
| 3,670,925 | 6/1972 | Moyant............................ | 137/68 X |
| 3,692,495 | 9/1972 | Schneiter et al. ............ | 280/150 AB |

Primary Examiner—David Schonberg
Assistant Examiner—John P. Silverstrim
Attorney, Agent, or Firm—Stevens, Davis, Miller & Mosher

[57] ABSTRACT

An inflatable restraint device for occupants of motor vehicles and the like comprising a gas cylinder having a valve adapted to be opened by a signal from collision detection means which may be collision prediction means or collision sensing means for ejecting gas therefrom, and a gas bag adapted to be inflated by the gas ejected from said gas cylinder. Said device further comprises gas cylinder valve opening means comprising a seal for the gas cylinder made of a material which tends to undergo brittle rupture, and a rupture inducing member for inducing the brittle rupture of said seal upon receipt of a signal from the collision detection means.

5 Claims, 3 Drawing Figures

PATENTED JUL 9 1974 3,822,895

INFLATABLE RESTRAINT DEVICE FOR OCCUPANTS OF VEHICLES AND THE LIKE

This invention relates to safety devices or so-called inflatable restraint devices for occupants of motor vehicles and the like, responsive to collision detection means, such as collision prediction means or collision sensing means, which comprise a gas bag adapted to be inflated upon occurence of collision or other accidents involving the vehicles on which the devices are mounted to restrain the occupants to their seats so as to ensure their safety. More particularly, it is concerned with gas cylinder valve opening means for the devices described.

Conventional gas cylinder valve opening means include (a) a type in which a piercing needle responsive to energization of an electromagnetic solenoid is used for puncturing a seal applied to a gas cylinder, (b) a type in which noninflammable gas is instantaneously gasified to provide high pressure gas by the thermal energy produced by the explosion of an initial explosive which high pressure gas is utilized for breaking a seal applied to a gas cylinder, and (c) a type in which the gas cylinder used consists of an outer container and an inner container and the inner container containing high pressure gas sealed therein is opened by the explosion of an initial explosive.

Some disadvantages are associated with these types of gas cylinder valve opening means of the prior art. The type (a) is complex in construction and high in cost. Besides, it is slow in responding to a collision detection signal. The types of (b) and (c) are relatively simple in construction but the handling of an explosive poses a problem hard to solve.

This invention has as its object the provision of gas cylinder valve opening means for inflatable restraint devices for occupants of motor vehicles and the like which obviates the aforementioned disadvantages of gas cylinder opening means of the prior art.

According to one aspect of this invention, there is provided, in an inflatable restraint device for occupants of motor vehicles and the like comprising a gas cylinder having a valve adapted to be opened by a signal from collision detection means which may be collision sensing means or collision prediction means for ejecting gas therefrom, and a gas bag adapted to be inflated by the gas ejected from said gas cylinder, gas cylinder valve opening means comprising a seal for the gas cylinder made of a material which tends to undergo brittle rupture, and a rupture inducing member for inducing the brittle rupture of said seal upon receipt of a signal from the collision detection means.

The material which tends to undergo brittle rupture according to this invention may be selected from the group comprising tempered glass, ceramics and plastics. For example, tempered glass is produced by uniformly heating ordinary glass to a temperature near its softening point and then quenching its surface. It is strained such that its surface is subjected to a compression stress and its interior is subjected to a tensile stress. It has five to ten times as high impact strength as does ordinary glass. However, it is broken to pieces or undergoes brittle rupture when a force higher than the limit of its strength is exerted on it or the quenched surface suffers damage, no matter how small the damage is. The seal made of such material is subjected to a thermal force to destroy the balance of stresses in the seal for inducing brittle rupture.

According to another aspect of this invention, there is provided bag protection means for precluding damage to the gas bag which might otherwise be caused by the broken pieces of the seal after rupture.

Figure 2:
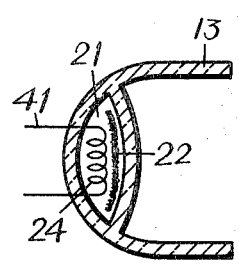
Figure 3:
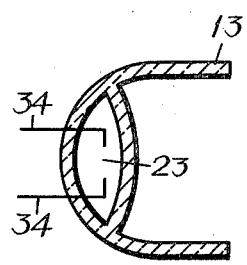

Additional objects as well as features and advantages of this invention will become evident from the description set forth hereinafter when considered in conjunction with the accompanying drawing, in which:

FIG. 1 is a sectional view of an inflatable restraint device for occupants of motor vehicles and the like incorporating one embodiment of this invention; and FIG. 2 and FIG. 3 are sectional views of essential portions of second and third embodiments of this invention respectively.

In FIG. 1, a ring 16 is shown as being threadably fitted in a gas outlet port 12 of a gas receptacle 11 secured to an instrument panel 10 of a motor vehicle. Ring 16 is provided with a cup-shaped seal 13 made of tempered glass, ceramics or plastics tending to undergo brittle rupture so as to close the outlet port. Said cup-shaped seal has its bottom faced to the bottom part of said gas receptacle and its upper opening disposed adjacent the exhaust opening of said gas receptacle. In the bottom part of the seal 13 is formed a cavity 20 and in said cavity rupture inducing means is enclosed. This rupture inducing means is filled with air or oxygen within said cavity 20 and disposed with a filament 14 therein and leads 15 are led out from the filament 14 and connected to a sensor means detecting or predicting a collision.

A gas bag protection member 17 which may be a parasol-shaped mesh or the like having permeability is mounted adjacent ring 16 on a side thereof opposite seal 13 or adjacent a gas bag 19 so as to prevent broken pieces of seal 13 from flying into gas bag 19. At the end of the vertical side surface of said gas bag protection means 17 is provided a control plate 18 for reducing the rate of inflow of gas from gas receptacle into the gas bag 19 and adjusting the direction of flow of gas. Control plate 18 functions concurrently as an auxiliary gas bag protection member.

FIG. 2 and FIG. 3 show second and third embodiments of this invention. In FIG. 2, a cavity 21 formed in seal 13 is shown as being filled with air or oxygen and having a filament 41 mounted therein as is the case with the first embodiments. In addition, cavity 21 has a piece 22 of aluminum, magnesium or other readily combustible metal sealed therein.

In FIG. 3, a cavity 23 formed in seal 13 is shown as being filled with a mixture of inflammable gases, such as oxygen and hydrogen, and having electrodes 34 mounted therein.

In operation, the filament 14 mounted in the cavity 20 of seal 13 of the first embodiment shown in FIG. 1 is burned red hot upon receipt of an electric signal from the collision detection means and heats inner wall surfaces of the cavity with the assistance of the oxygen or other gas sealed in cavity 20. As a result, the stress balance of the surface and interior of seal 13 is destroyed and seal 13 undergoes brittle rupture, so that the valve of gas receptacle 11 is opened. The breakdown of seal 13 by its own brittle rupture is promoted by the pressure of high pressure gas in the gas cylinder being applied to the seal.

In the embodiments shown in FIG. 2 and FIG. 3, the brittle rupture of the seal is induced by heating inner wall surface of cavity 21 and 23. The inner wall of the cavity is heated by the combustion of combustible metal 22 in the second embodiment and by the combustion of the gas mixture caused to take place by a discharge between electrodes 34, 34 in the third embodiment.

When seal 13 is broken by its own brittle rupture, gas flows out of gas receptacle 11 through outlet port 12 into gas bag 19 so that the gas bag is inflated into a double dot and dash line position 29, thereby restraining the occupant to the seat to ensure safety thereof.

When the gas in the gas receptacle flows into gas bag 19 after the breakdown of seal 13, the broken pieces of seal 13 are prevented from flying into gas bag 19 by gas bag protection member 17 and control plate 18. Member 17 and plate 18 are thus effective to stop the onrush of the broken pieces into the gas bag and preclude damage to the gas bag. The danger of the broken pieces of the seal damaging the gas bag is lessened when the seal is made of reinforced glass, because the broken pieces of reinforced glass has no sharp edges. Besides, control plate 18 performs the funciton of slowing down the rate of flow of gas into the gas bag and control the flow of gas so as to properly inflate the gas bag.

From the foregoing description, it will be appreciated that this invention obviates the disadvantages of conventional valve opening means for inflatable restraint devices for occupants of motor vehicles and the like and offers advantages in that the valve opening means provided by this invention is low in cost and effective to open the valve in a very short time interval.

What is claimed is:

1. An inflatable restraint device for occupants of motor vehicles and the like comprising;
   a sensor of a collision detecting device sensing a collision of the motor vehicles,
   a gas receptacle opened by a signal from said sensor and being capable of exhausting gas,
   a gas bag inflatable by exhausted gas from said gas receptacle,
   a cup-shaped seal made of a material which tends to undergo brittle rupture,
   an opening of said cup-shaped seal being disposed near an exhausting opening of said gas receptacle and a bottom part of said cup-shaped seal being faced to the bottom part of said gas receptacle, a cavity formed in the bottom of said seal,
   a rupture inducing means enclosed in said cavity,
   a parasol-shaped gas bag protector having permeability provided on the opening of said seal and covering said opening,
   a control plate provided on the end of said gas bag protector member,
   said control plate reducing the rate of inflow of gas into the gas bag and adjusting the direction of inflow of gas, and
   said seal, gas bag protector member, control plate and collapsed gas bag being arranged in sequence at the exhaust opening of said gas receptacle.

2. An inflatable restraint device for occupants of motor vehicles and the like as defined in claim 1 wherein said material which tends to undergo brittle rupture is formed of tempered glass, ceramics or plastics.

3. An inflatable restraint device for occupants of motor vehicles as defined in claim 1 wherein said rupture inducing means comprises oxygen enclosed within said cavity of the seal, a filament disposed within said cavity and leads connected to said filament, said leads connected to said sensor of a collision detecting device.

4. An inflatable restraint device for occupants of motor vehicles as defined in claim 1 wherein said rupture inducing means comprises oxygen enclosed within the cavity of the seal, a filament disposed within said cavity, aluminum disposed within said cavity to be ignited by heat produced in said filament and leads connected to said filament, said leads connected to said sensor of a collision detecting device.

5. An inflatable restraint device for occupants of motor vehicles as defined in claim 1 wherein said rupture inducing means comprises oxygen enclosed within the cavity of the seal, a filament disposed within said cavity, magnesium disposed within said cavity to be ignited by heat produced in said filament and leads connected to said filament, said leads connected to said sensor of a collision detecting device.

* * * * *